114-51 SR
FIP8407 OR PC 154
T. Elgar.
Towing.
Nº 154.
9226X
Reissued Dec. 25, 1849.
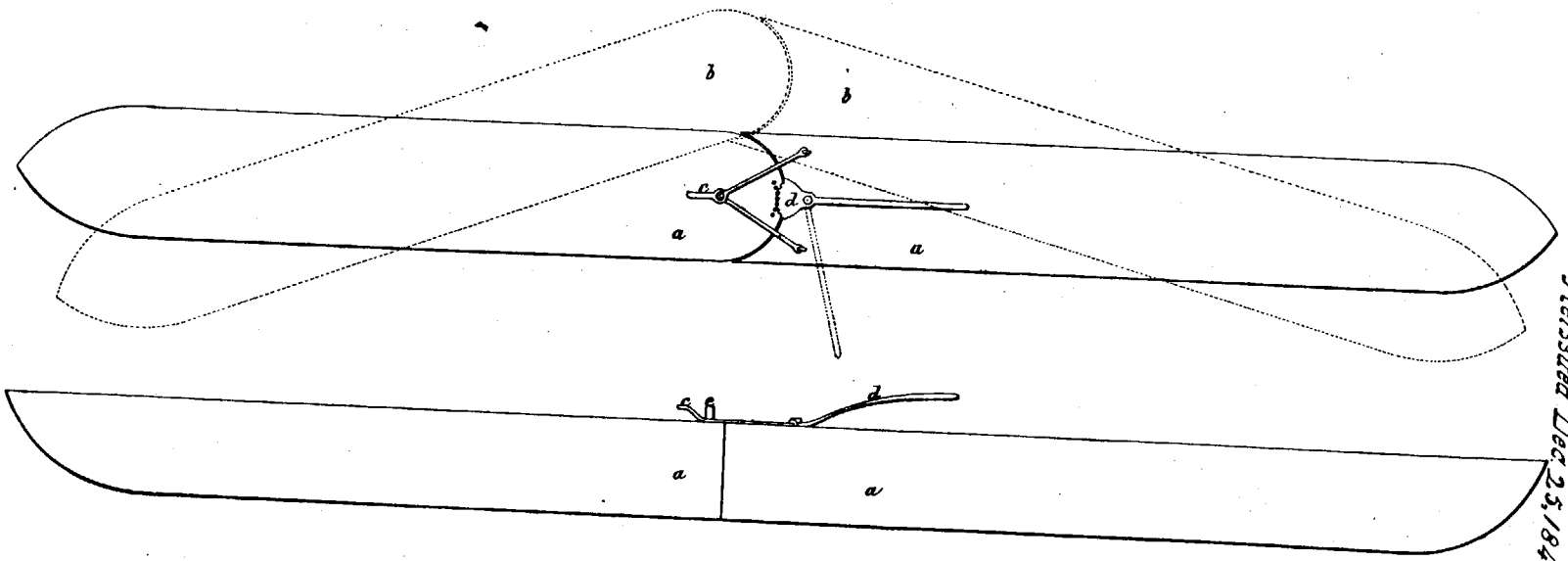
M. PETERS, PHOTO-LITHOGRAPHER, WASHINGTON, D. C.

UNITED STATES PATENT OFFICE.

JOHN ELGAR, OF BALTIMORE, MARYLAND.

METHOD OF ATTACHING SECTIONAL BOATS TO EACH OTHER BY MEANS OF A RULE-JOINT.

9226X

Specification forming part of Letters Patent dated November 7, 1835; extended November 7, 1849; Reissue No. 154, dated December 25, 1849.

*To all whom it may concern:*

Be it known that I, JOHN ELGAR, of the city of Baltimore, in the State of Maryland, have invented certain Improvements in the Apparatus for the Conveyance or Transportation of Goods in Canal-Boats; and I do hereby declare that the following is a full and exact description of my said invention or improvement.

The object which I have in view in the first instance, is to prevent the necessity of removing the goods from the vehicle within which they are first loaded by constructing cases, which serve on railroads as car-bodies and on canals as boats. This I effect by making such vehicles or car-bodies of sheet-iron, in the manner of iron tanks, riveting them water-tight in the same way. The dimensions of these bodies must be determined by those of the canal-locks through which they are to pass when used as boats. If, for example, the lock will admit a boat of fourteen feet in width and eighty feet in length, the bodies may be made seven feet wide and twenty feet long, so that eight bodies, two abreast and four in length, may pass at the same time. I intend sometimes to make the bodies wholly of sheet-iron; but they may be made of that material to the height of about three feet only, with an additional height—say, of three feet—made of wood. The bodies when made of this length are to be carried upon eight-wheel cars. If four-wheel cars are preferred, the bodies must be made of a length suitable thereto, and a greater number of them will then, of course, be connected together when in the water. As these bodies are by their combination to form canal-boats, the requisite number of them are to be so formed at one end as to constitute a well-shaped bow, and the same number are to be so shaped as to constitute a stern. The other ends are to be made square, so that when connected by proper fastenings they will be in one continuous inflexible line to the length of the lock through which they are to pass.

It is a well-known fact that the resistance to a boat moving through the water is merely at the cross-sections of the part immersed, without regard to length, and I contemplate the obtaining a great advantage from the application of this principle in the conversion of car-bodies into boats, as they are to be made but half of the width of an ordinary boat. Their draft being the same, their cross-section will be but one-half. I contemplate, therefore, the coupling of these bodies together in one continuous line without placing them side by side, excepting when they are passing through locks, by which means but one-half the power of traction ordinarily required will be found necessary, the foremost and hindmost bodies constituting a stem and stern. The great length given to the combined boat in this case will render it necessary to make provision for passing along those parts of the canal when there is any considerable curvature. For this purpose I construct a certain number of the bodies in such a manner as that when coupled, so as to constitute a canal-boat, they will form a rule-joint, which will allow of the requisite lateral motion to conform them to the curvature of the canal. To make such a joint, the end of the bodies composing it must terminate in the concave arc of a semi-circle, and that of the corresponding one in a convex semi-circle, adapted to each other. The distance apart of these flexible joints should be equal to that of an ordinary canal-boat, so that when detached they will pass side by side through locks. The rule-joint sections are to be coupled together by a connecting-bar, which falls or is placed on a strong upright pin fixed in the center of the circumference of the joint, or in any other convenient mode. To cause the boats so connected to conform to the curvature of the canal, and to steer them by making one act as a rudder to the other, I fix a wheel and pinion, or adopt a lever or other power at each rule-joint, so as to communicate the requisite degree of flexture. A compound boat of any desirable length may thus be formed and managed. The first of the series of sections only being bow-formed and the last only being stern-formed, the bodies may be transferred from the car-frames to the water, and from the water to the car-frames by means of powerful cranes; but the mode which I intend in general to adopt is to extend the railway down into the basin, in the manner of marine-railways. The bodies may thus be made to float from and to the cars with facility. The rule-joint and mode of steering I also intend to apply to canal-boats of the ordinary construction and length, but reduced in breadth one-half, so that in passing through locks the boats may be disconnected at the joints and pass through side by side in pairs, thus obtaining the advantage before alluded to as resulting from the diminution of the cross-section, and admitting of an increased velocity, with a decreased injury to the banks of the canal.

In the annexed drawing, *a a* are two canal-boats, of usual length, connected end to end at *b b*. This combined boat is thrown into an angle.

*d* is a helm or lever having cogs on the end working in a rack, the operation of which steers the boat.

*c* is a clevis or triangle bar, which, falling on the pin *e*, connects the boats, and by lifting it they are detached.

What I claim as my invention in the foregoing is—

The connecting of canal-boats by rule-joints, for the purpose of adapting them to the curvature of the canal, and of steering them by their action upon each other, upon the same principle with that by which a rudder is made to steer an ordinary boat.

I do not claim the invention of portable section-boats hereinbefore described.

JOHN ELGAR.

Witnesses:
HENRY B. LATROBE,
LLEWELLYN A. BARRY.